United States Patent
Jaradi et al.

(10) Patent No.: US 11,292,422 B1
(45) Date of Patent: Apr. 5, 2022

(54) AIRBAG ASSEMBLY

(71) Applicant: Ford Global Technologies, LLC, Dearborn, MI (US)

(72) Inventors: Dean M. Jaradi, Macomb, MI (US); Zhenyan Gao, Northville, MI (US); S. M. Iskander Farooq, Novi, MI (US); Mohammad Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/086,630

(22) Filed: Nov. 2, 2020

(51) Int. Cl.
*B60R 21/2338* (2011.01)
*B60R 21/203* (2006.01)
*B60R 21/233* (2006.01)
*B60R 21/235* (2006.01)
*B60R 21/231* (2011.01)

(52) U.S. Cl.
CPC ........ *B60R 21/2338* (2013.01); *B60R 21/203* (2013.01); *B60R 2021/23107* (2013.01); *B60R 2021/23324* (2013.01); *B60R 2021/23386* (2013.01); *B60R 2021/23571* (2013.01)

(58) Field of Classification Search
CPC .............. B60R 21/2338; B60R 21/203; B60R 2021/23107; B60R 2021/23324; B60R 2021/23386; B60R 2021/23571
See application file for complete search history.

(56) References Cited

U.S. PATENT DOCUMENTS

| | | | |
|---|---|---|---|
| 9,845,067 B2 * | 12/2017 | Morris | B60R 21/239 |
| 10,065,594 B2 * | 9/2018 | Fukawatase | B60R 21/2338 |
| 10,336,280 B2 * | 7/2019 | Faruque | B60R 21/2338 |
| 10,875,484 B2 * | 12/2020 | Nakajima | B60R 21/203 |
| 10,988,102 B2 * | 4/2021 | Stegmeier | B60R 21/233 |
| 2008/0129022 A1 * | 6/2008 | Dennis | B60R 21/233 280/728.2 |
| 2017/0057453 A1 * | 3/2017 | Morris | B60R 21/203 |
| 2018/0290616 A1 | 10/2018 | Nakajima et al. | |
| 2018/0354447 A1 | 12/2018 | Nakajima et al. | |
| 2020/0047703 A1 | 2/2020 | Skrodzki | |
| 2021/0300280 A1 * | 9/2021 | Jaradi | B60R 21/203 |

FOREIGN PATENT DOCUMENTS

| | | | | |
|---|---|---|---|---|
| CN | 112550203 A | * | 3/2021 | ............. B60R 21/26 |
| GB | 2552146 A | | 1/2018 | |
| JP | 2018047845 A | | 3/2018 | |
| KR | 20180033861 A | * | 4/2018 | |
| WO | WO-2016006319 A1 | * | 1/2016 | ........... B60R 21/203 |
| WO | WO-2018007311 A1 | * | 1/2018 | ........... B60R 21/231 |

* cited by examiner

*Primary Examiner* — Drew J Brown
(74) *Attorney, Agent, or Firm* — Frank A. MacKenzie; Bejin Bieneman PLC (57) ABSTRACT

A restraint system includes a reaction surface and an airbag supported by the reaction surface. The airbag is inflatable along an axis away from the reaction surface to an inflated position. The airbag includes an inner portion and an outer portion concentric with the inner portion about the axis. The inner portion and the outer portion define a gap therebetween in the inflated position. The airbag includes a panel extending radially across the gap from the inner portion to the outer portion. The panel is uninflatable.

20 Claims, 6 Drawing Sheets

AIRBAG ASSEMBLY

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

A restraint system includes a reaction surface and an airbag supported by the reaction surface. The airbag is inflatable along an axis away from the reaction surface to an inflated position. The airbag includes an inner portion and an outer portion concentric with the inner portion about the axis. The inner portion and the outer portion define a gap therebetween in the inflated position. The airbag includes a panel extending radially across the gap from the inner portion to the outer portion. The panel is uninflatable.

The panel may be attached to the inner portion and the outer portion.

The outer portion in the inflated position may extend farther along the axis away from the reaction surface than the inner portion in the inflated position.

The inner portion in the inflated position may extend circumferentially about the axis, and the outer portion in the inflated position may extend annularly around the inner portion.

The gap may extend annularly around the inner portion in the inflated position.

The panel may extend endlessly about the axis.

The restraint system may include an instrument panel. The reaction surface may be a steering wheel supported by the instrument panel and the airbag may include a plurality of extensions extending from the outer portion to the instrument panel in the inflated position.

The airbag may include a tether extending annularly about the axis to each extension. The tether may be attached to each extension.

Each extension may be disposed between the outer portion and the tether.

The extensions may be generally U-shaped between the outer portion and the instrument panel.

The reaction surface may be one of an instrument panel, a steering wheel, or a seatback.

An airbag includes an inner portion and an outer portion each being inflatable in a first direction along an axis to an inflated position. The outer portion is concentric with the inner portion about the axis. The inner portion and the outer portion define a gap therebetween in the inflated position. A panel extends radially across the gap from the inner portion to the outer portion. The panel is uninflatable.

The panel may be attached to the inner portion and the outer portion.

The outer portion in the inflated position may extend farther along the axis than the inner portion in the inflated position.

The inner portion may extend circumferentially about the axis, and the outer portion may extend annularly around the inner portion.

The gap may extend annularly around the inner portion in the inflated position.

The panel may extend endlessly about the axis.

The airbag may include a plurality of extensions extending from the outer portion in the inflated position. The extensions may extend in a second direction opposite the first direction in the inflated position.

Each extension may include two ends spaced from each other about the axis and attached to the outer portion. Each extension may be generally U-shaped between the respective ends.

The airbag may include a tether extending annularly about the axis to each extension. The tether may be attached to each extension.

With reference to the Figures, wherein like numerals indicate like parts throughout the several views, a vehicle 10 is generally shown. The vehicle 10 includes a restraint system 12. The restraint system 12 includes a reaction surface 14 and an airbag 16 supported by the reaction surface 14. The airbag 16 is inflatable along an axis A away from the reaction surface 14 to an inflated position. The airbag 16 includes an inner portion 18 and an outer portion 20 concentric with the inner portion 18 about the axis A. The inner portion 18 and the outer portion 20 define a gap 22 therebetween in the inflated position. The airbag 16 includes a panel 24 extending radially across the gap 22 from the inner portion 18 to the outer portion 20. The panel 24 is uninflatable.

Figure 1:
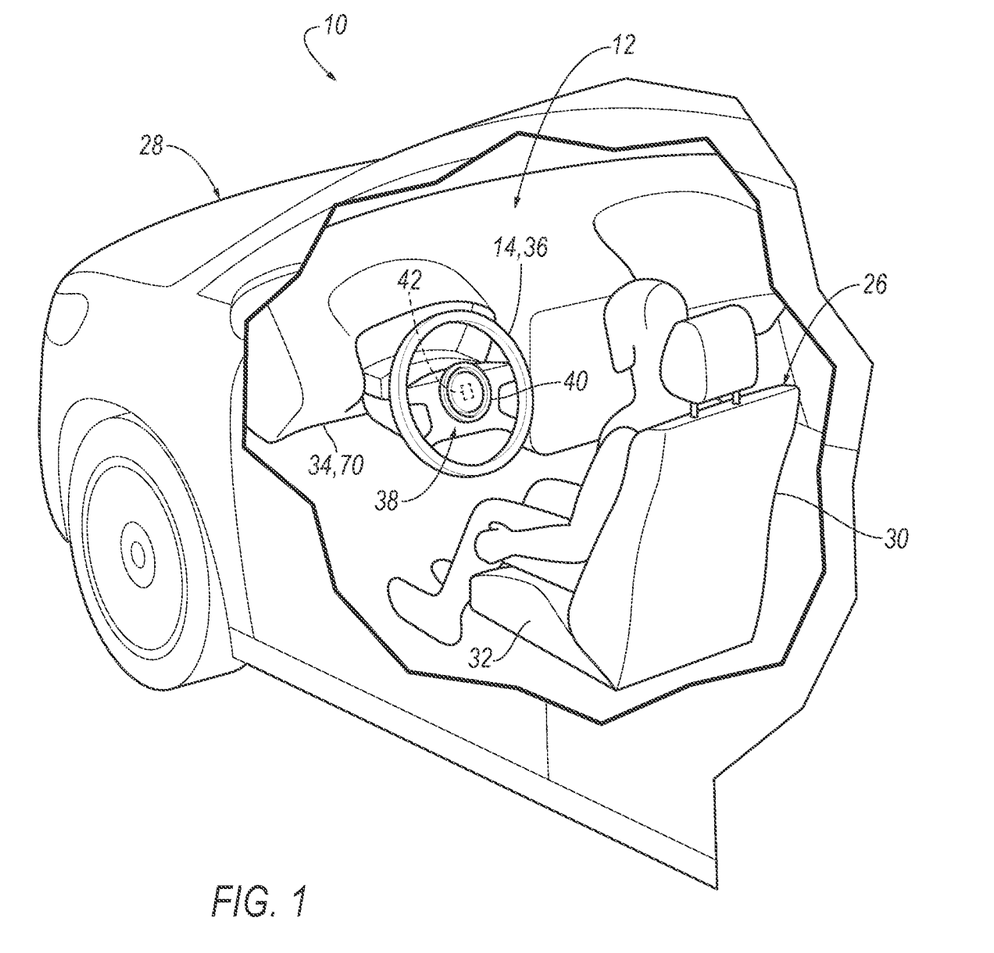
FIG. 1 is a perspective view of an example vehicle including an airbag in an uninflated position.

During a vehicle impact, the airbag 16 may be inflated from an uninflated position, as shown in FIG. 1, to an inflated position, as shown in FIGS. 2A-3B. During the vehicle impact, an occupant of a seat 26 may be forced into the airbag 16 in the inflated position. The airbag 16 may provide coverage so as to control the kinematics of the occupant, e.g., a head of the occupant. As one example, in a frontal vehicle impact, the occupant is urged vehicle-forward and the airbag 16 controls the occupant kinematics. During offset and oblique impacts, e.g., frontal offset impacts, far side oblique impacts, near side oblique impacts, etc., the occupant is urged at an angle relative to vehicle-forward. During these types of impacts, the head of the occupant may impact the outer portion 20 of the airbag 16. When the outer portion 20 is impacted by the occupant, the panel 24 may provide a counteracting force against the outer portion 20, which may assist in maintaining a position of the outer portion 20. That is, the panel 24 may provide lateral support for the outer portion 20. Because the panel 24 provides lateral support to the outer portion 20, the airbag 16 can also provide coverage to control the kinematics of the occupant during offset and oblique impacts.

With reference to FIG. 1, the vehicle 10 may be any type of passenger or commercial automobile such as a car, a truck, a sport utility vehicle, a crossover, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

With reference to FIG. 1, the vehicle 10 may include a body 28 defining a passenger cabin (not numbered) to house occupants, if any, of the vehicle 10. The body 28 includes doors openable to allow ingress to and egress from the passenger cabin.

The passenger cabin may extend across the vehicle 10, i.e., from one side to the other side of the vehicle 10. The passenger cabin includes a front end (not numbered) and a rear end (not numbered) with the front end being in front of the rear end during forward movement of the vehicle 10. The passenger cabin includes one or more seats 26. The seats 26 may be arranged in any suitable arrangement. For example, one or more of the seats 26 may be at the front end of the passenger cabin, i.e., a front seat, and/or one or more of the seats 26 may be at the rear end of the passenger cabin, i.e., a rear seat.

With continued reference to FIG. 1, each seat 26 may include a seatback 30 and a seat bottom 32. The seatback 30 may be supported by the seat bottom 32 and may be stationary or movable relative to the seat bottom 32. The seatback 30 and the seat bottom 32 may be adjustable in multiple degrees of freedom. Specifically, the seatback 30 and the seat bottom 32 may themselves be adjustable, in other words, adjustable components within the seatback 30 and/or the seat bottom 32 may be adjustable relative to each other.

The vehicle 10 includes an instrument panel 34. The instrument panel 34 is disposed at the front end of the passenger cabin. The instrument panel 34 may provide mounting locations for vehicle controls, such as a steering wheel 36; gauges, dials, and information displays; heating and ventilation equipment; a radio; and other electronics; etc. The instrument panel 34 may extend across the front end of the passenger cabin from one side of the vehicle 10 to the other side of the vehicle 10, i.e., across the passenger cabin in a cross-vehicle direction. For example, the instrument panel 34 may extend from a front pillar to another front pillar. Specifically, the front pillars may extend from the roof to the instrument panel 34. The instrument panel 34 may, for example, be fixed to a bulkhead of the vehicle 10 that separates the passenger cabin from an engine compartment of the vehicle 10.

The reaction surface 14 is a rigid surface against which the airbag 16 pushes when the airbag 16 is in the inflated position and an occupant is impacting the airbag 16. That is, the airbag 16 is disposed between the occupant and the reaction surface 14. When the airbag 16 is in the inflated state, the reaction surface 14 may provide a counteracting force against the airbag 16 when the airbag 16 is impacted by the head of the occupant such that the airbag 16 is squeezed between the head of the occupant and the reaction surface 14.

The reaction surface 14 may, for example, be the steering wheel 36, as shown in the Figures. As another example, the reaction surface 14 may be the instrument panel 34. As another example, the reaction surface 14 may be a seatback 30 of a seat 26, e.g., a front seat. In these examples, the airbag 16 may be inflatable from the reaction surface 14 in a vehicle-rearward direction. In the alternative to the examples above, the reaction surface 14 may be any suitable surface in the vehicle 10.

The restraint system 12 includes an airbag assembly 38. The airbag assembly 38 may include a housing 40, an inflator 42, and the airbag 16. The airbag 16 is supported by the reaction surface 14, e.g., via the housing 40. The restraint system 12 may include any suitable number of airbag assemblies 38, e.g., one or more. For example, the restraint system 12 may include a plurality of airbag assemblies 38. In such an example, the restraint system 12 may include one airbag assembly 38 for each seat 26 in the passenger cabin.

The housing 40 houses the airbag 16 in an uninflated position, as shown in FIG. 1, and supports the airbag 16 in an inflated position. The airbag 16 may be rolled and/or folded to fit within the housing 40 in the uninflated position. The housing 40 may be of any suitable material, e.g., a rigid polymer, a metal, a composite, or a combination of rigid materials. The housing 40 may, for example, include clips, panels, etc. for attaching the airbag 16 and for attaching the airbag assembly 38 to the reaction surface 14.

The airbag 16 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The airbag 16 may be a single continuous unit, e.g., a single piece of fabric. Alternatively, the airbag 16 may include a plurality of segments, i.e., two or more. The segments may be attached to each other in any suitable fashion, e.g., a plurality of panels attached by stitching, ultrasonic welding, etc.

The airbag 16 is supported by the reaction surface 14, as set forth above. The airbag 16 may be disposed in the reaction surface 14 in the uninflated position, as shown in FIG. 1, and extend from and remain supported by the reaction surface 14 in the inflated position, as shown in FIGS. 2A-3B. The airbag 16 inflates along the axis A generally parallel to the vehicle-rearward direction. In this context, "generally" means that the axis A extends toward an occupant of a seat 26 adjacent the reaction surface 14, i.e., with the lack of anything between the seat 26 and the reaction surface 14, even if the axis A deviates from parallel.

Figure 2A:
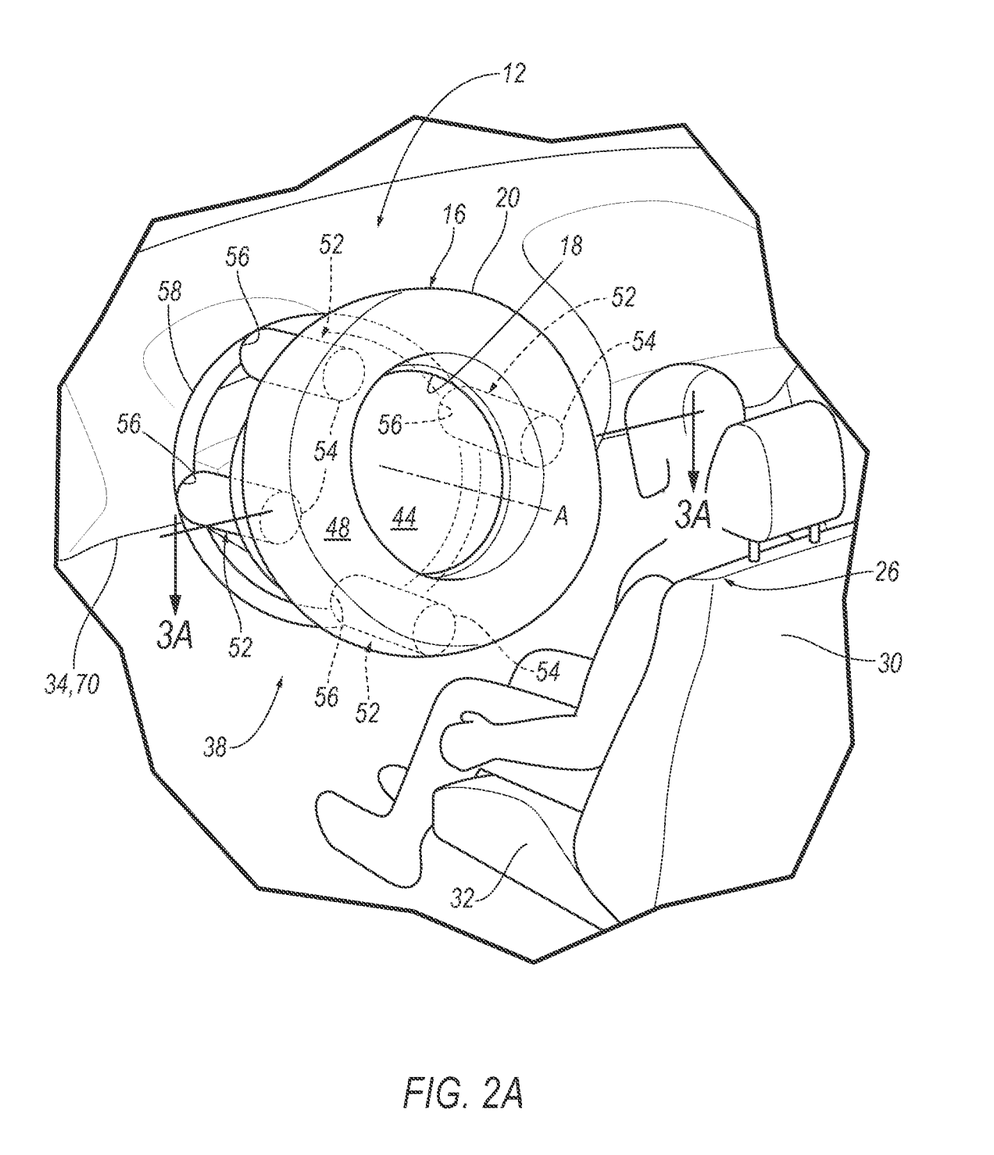
FIG. 2A is a perspective view of the vehicle including the airbag in an inflated position and including an example of a plurality of extensions.
Figure 2B:
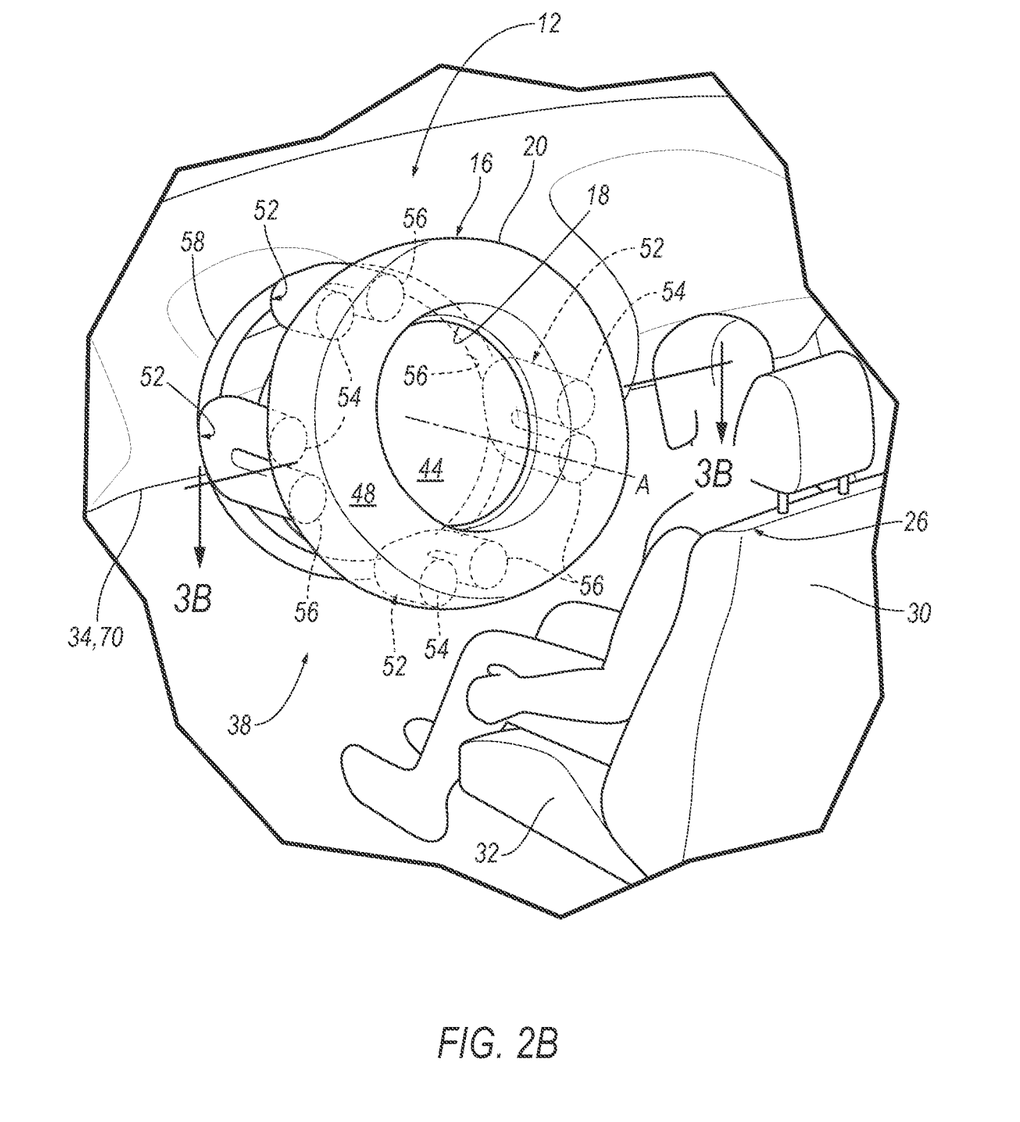
FIG. 2B is a perspective view of the vehicle including the airbag in the inflated position and including another example of a plurality of extensions.

The inner portion 18 in the inflated position extends along the axis A towards the seat 26, i.e., in the vehicle-rearward direction away from the reaction surface 14. The inner portion 18 in the inflated position may extend any suitable amount along the axis A. Additionally, the inner portion 18 in the inflated position extends about that axis A, i.e., completely around the axis A. For example, the inner portion 18 may extend circumferentially about the axis A in the inflated position, as shown in FIGS. 2A and 2B. In other words, the inner portion 18 may have a round shape, e.g., circular, elliptical, etc. The inner portion 18 may extend any suitable amount about that axis A, i.e., have any suitable diameter.

Figure 3A:
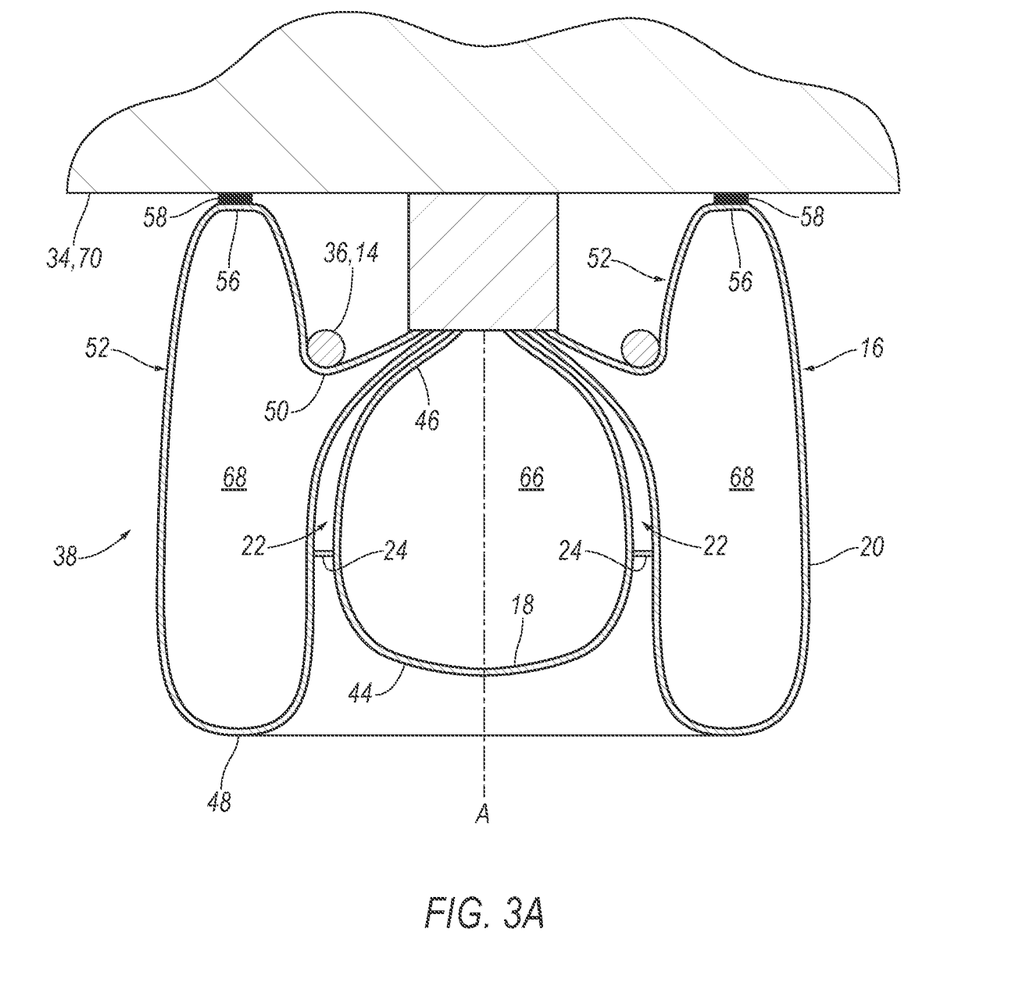
FIG. 3A is a cross-sectional view along line 3A in FIG. 2A.
Figure 3B:
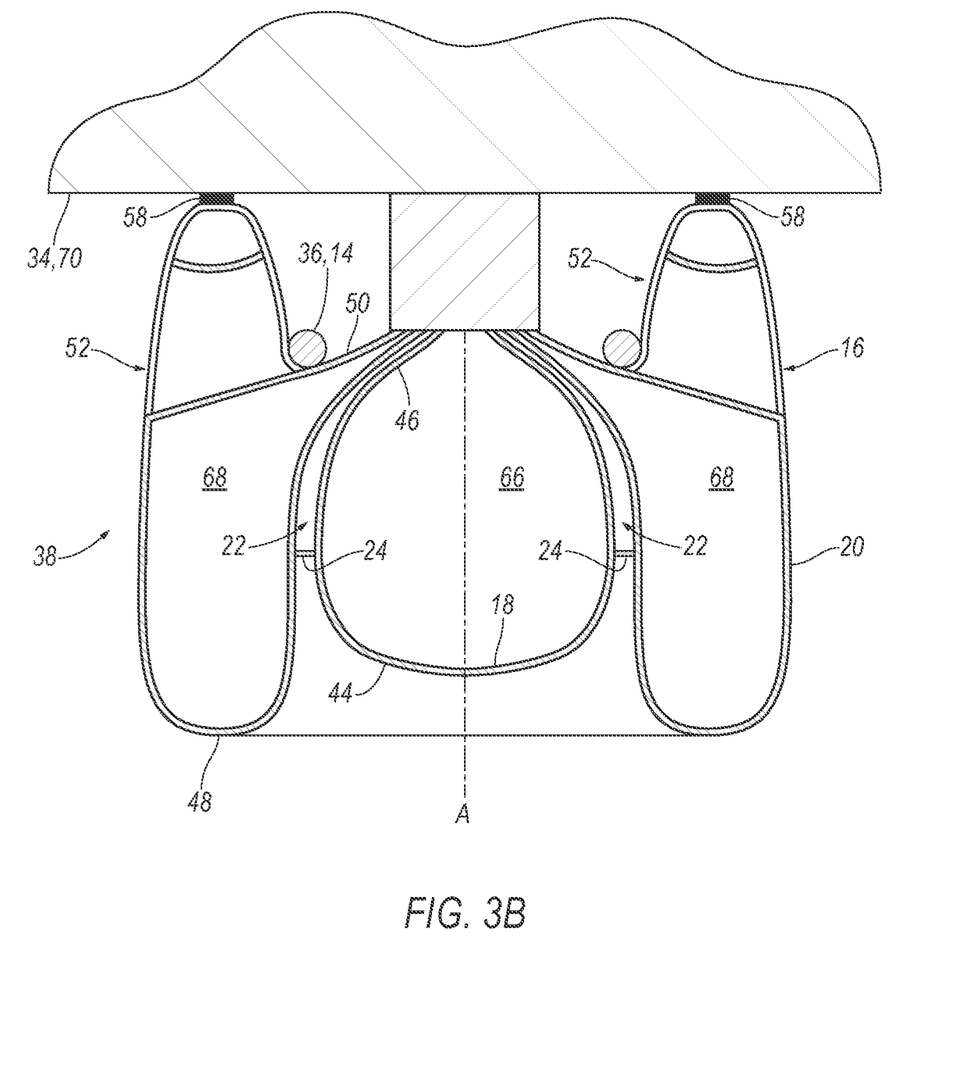
FIG. 3B is a cross-sectional view along line 3B in FIG. 2B.

The inner portion 18 may include a forward-facing panel 46 and a rearward-facing panel 44 facing in opposite directions in the inflated position, as shown in FIGS. 3A and 3B. The forward-facing panel 46 and the rearward-facing panel 44 are connected to each other. The forward-facing panel 46, in the inflated position, may, for example, face the reaction surface 14, i.e., in a vehicle-forward direction. In other words, the forward-facing panel 46 may face away from the occupants of the passenger cabin. The forward-facing panel 46 may be disposed between the rearward-facing panel 44 and the reaction surface 14.

The rearward-facing panel 44, in the inflated position, may, for example, face an intended occupant, e.g., the occupant of the seat 26, i.e., in the vehicle-rearward direction. The rearward-facing panel 44 is positioned to receive and be impacted by the occupant when the inner portion 18 is inflated during an impact that urges the occupant toward the airbag 16. In other words, the rearward-facing panel 44 may be referred to as "an impact panel."

The inner portion 18, e.g., the rearward-facing panel 44 and the forward-facing panel 46, may define an inflation chamber 66 therebetween, as shown in FIGS. 3A and 3B. During inflation, the inflation chamber 66 may be inflated from the uninflated position to the inflated position. For example, the rearward-facing panel 44 may be in fluid communication with the inflation chamber 66. In this situation, the rearward-facing panel 44 may be pushed in the vehicle-rearward direction away from the housing 40, i.e., the reaction surface 14, and along the axis A by gas flow in the inflation chamber 66 of the inner portion 18 during inflation of the airbag 16. That is, the rearward-facing panel 44 is spaced from the housing 40, i.e., the reaction surface 14, along the axis A in the inflated position.

The outer portion 20 in the inflated position extends about the axis A. Specifically, the outer portion 20 is concentric with the inner portion 18 about the axis A, as set forth above. In other words, the axis A is central to both the inner portion 18 and the outer portion 20 such that the inner portion 18 and the outer portion 20 share the axis A. The outer portion 20 in the inflated position extends around the inner portion 18 in the inflated position, as shown in FIGS. 2A and 2B. The outer portion 20 may extend any suitable amount around the inner portion 18. For example, the outer portion 20 in the inflated position may extend completely around the inner portion 18 in the inflated position, i.e., 360 degrees around the axis A. That is, the outer portion 20 may have an annular shape. The outer portion 20 in the inflated position is radially spaced from the inner portion 18 in the inflated position relative to the axis A. The outer portion 20 may be radially spaced from the inner portion 18 by any suitable amount.

Additionally, the outer portion 20 in the inflated position extends along the axis A towards the seat 26, i.e., in the vehicle-rearward direction away from the reaction surface 14. The outer portion 20 in the inflated position extends farther along the axis A than the inner portion 18 in the inflated position, as shown in FIGS. 3A and 3B. That is, at least a portion of the outer portion 20 in the inflated position is disposed between the rearward-facing panel 44 of the inner portion 18 in the inflated position and the seat 26, i.e., the occupant. In other words, the rearward-facing panel 44 of the inner portion 18 in the inflated position is disposed between the reaction surface 14 and at least a portion of the outer portion 20 in the inflated position.

The outer portion 20 may include a forward-facing panel 50 and a rearward-facing panel 48 facing in opposite directions in the inflated position, as shown in FIGS. 3A and 3B. The forward-facing panel 50 and the rearward-facing panel 48 are connected to each other. The forward-facing panel 50, in the inflated position, may, for example, face the reaction surface 14, i.e., in a vehicle-forward direction. In other words, the forward-facing panel 50 may face away from the occupants of the passenger cabin. The forward-facing panel 50 may be disposed between the rearward-facing panel 48 and the reaction surface 14.

The rearward-facing panel 48, in the inflated position, may, for example, face an intended occupant, e.g., the occupant of the seat 26, i.e., in the vehicle-rearward direction. The rearward-facing panel 48 is positioned to receive and be impacted by the occupant when the outer portion 20 is inflated during an impact that urges the occupant toward the airbag 16. In other words, the rearward-facing panel 48 may be referred to as "an impact panel."

The outer portion 20, e.g., the rearward-facing panel 48 and the forward-facing panel 50, may define an inflation chamber 68 therebetween, as shown in FIGS. 3A and 3B. During inflation, the inflation chamber 68 may be inflated from the uninflated position to the inflated position. For example, the rearward-facing panel 48 may be in fluid communication with the inflation chamber 68. In this situation, the rearward-facing panel 48 may be pushed in the vehicle-rearward direction away from the housing 40, i.e., the reaction surface 14, along the axis A by gas flow in the inflation chamber 68 during inflation of the airbag 16. That is, the rearward-facing panel 48 is spaced from the housing 40, i.e., the reaction surface 14, in the inflated position. Specifically, the rearward-facing panel 48 is between the rearward-facing panel 44 of the inner portion 18 and the occupant, i.e., adjacent the occupant of the seat 26, in the inflated position.

The inner portion 18 and the outer portion 20 may be fluidly separated from each other. Fluidly separated means little or no inflation medium flows from one to another, but the inflation medium can come from the same source, e.g., a common inflator 42 that separately feeds the inner portion 18 and the outer portion 20 through separate fill tubes. As one example, the inner portion 18 and the outer portion 20 are completely fluidly separated, i.e., there is not flow of inflation medium between the inner portion 18 and the outer portion 20. In another example, due to manufacturing and material capabilities, a minimal amount of inflation medium may flow between the inner portion 18 and the outer portion 20, e.g., through panels, seams etc. In any event, in scenarios when the airbag 16 is inflated and impacted, the pressure in the inner portion 18 and the outer portion 20 are independent, i.e., no appreciable pressure difference is communicated from one of the inner and outer portions, 18, 20 to the other of the inner and outer portions, 18, 20.

As set forth above, the outer portion 20 and the inner portion 18 define the gap 22 therebetween. The gap 22 is external to the inflation chambers 66, 68 of the inner and outer portions 18, 20, as shown in FIGS. 3A and 3B. That is, the gap 22 is open to, i.e., in fluid communication with, the environment. The gap 22 extends radially from the inner portion 18 to the outer portion 20. The gap 22 may extend any suitable amount circumferentially about the axis. For example, the gap 22 may extend endlessly about the axis A. That is, the gap 22 may extend completely around the inner portion 18.

With reference to FIGS. 3A and 3B, the panel 24 is disposed between the outer portion 20 and the inner portion 18 of the airbag 16. That is, the panel 24 is disposed external to the inflation chambers 66, 68 of the inner and outer portions 18, 20. The panel 24 extends across the gap 22 from the outer portion 20 to the inner portion 18. The panel 24 includes a surface (not numbered) extending circumferentially around the axis A and radially relative to the axis A. The surface faces the occupant of the seat 26 and extends in a plane transverse to the axis A. For example, the plane may be generally orthogonal to the axis A.

The panel 24 may, for example, extend completely around the inner portion 18, i.e., 360 degrees around the axis A. In such an example, the panel 24 may have an annular shape. As another example, the panel 24 may extend partially around the inner portion 18, i.e., less than 360 degrees around the axis A. In such an example, the airbag 16 may include a plurality of panels 24 spaced from each other circumferentially about the axis A. Each panel 24 may extend any suitable amount about the axis A. The panels 24 may extend a same or different amount about the axis A.

Additionally, the panel 24 may be disposed at any suitable position along the axis A relative to the inner portion 18. For example, the panel 24 may be disposed between the rearward-facing panel 44 of the inner portion 18 and the reaction surface 14, as shown in FIGS. 3A and 3B. As another example, the panel 24 may be disposed at the rearward-facing panel 44 of the inner portion 18. The panel 24 may be attached to the inner portion 18 and the outer portion 20, e.g., via stitching, ultrasonic welding, etc.

The panel 24 may be uninflatable. In other words, the panel 24 may not define an inflation chamber, e.g., the panel 24 may be a panel of material that is not fixed to another panel, or itself, to enclose a volume for receiving inflation medium. The panel 24 may be a woven fabric, a solid polymeric sheet, or any other suitable material.

The panel 24 may be under tension when the airbag 16 in the inflated position. In other words, the panel 24 may be taught, i.e., not relaxed, when airbag 16 is in the inflated position. By tensioning the panel 24, the panel 24 may reinforce the outer portion 20 of the airbag 16 when the outer portion 20 is impacted by an occupant. That is, the panel 24 may assist in maintaining the shape of the outer portion 20 when the occupant impacts the airbag 16. By maintaining the shape of the outer portion 20, the panel 24 may assist the airbag 16 in controlling occupant kinematics.

Each portion 18, 20 of the airbag 16 may include a plurality of internal tethers (not shown) disposed in an inflation chamber 66, 68 of the respective portion. The internal tethers may extend across the respective inflation chamber 66, 68, e.g., from the housing 40 to the respective rearward-facing panel 44, 50. The internal tethers may be fixed, e.g., via stitching, ultrasonic welding, etc., to the housing 40 and the respective rearward-facing panel 44, 50 in the respective inflation chamber 66, 68. Each portion 18, 20 may include any suitable number of internal tethers. The internal tethers may be any suitable material. For example, the internal tethers may be a same material as the airbag 16. The internal tethers may be positioned to control the shapes of each of the inner and outer portions 18, 20.

The airbag 16 may include a plurality of extensions 52. For example, when the reaction surface 14 is a steering wheel 36, the outer portion 20 may extend around the steering wheel 36. In this situation, the outer portion 20 may lack a reaction surface. The extensions 52 may extend from the outer portion 20 to another surface in the vehicle 10, e.g., the instrument panel 34, such that the other surface acts as a second reaction surface 70 for the outer portion 20. Specifically, the extensions 52 are spaced from the second reaction surface 70 in the uninflated position and inflates from the reaction surface 14, e.g., the steering wheel 36, to the second reaction surface 70 and abuts the reaction surface 14 in the inflated position. The extensions 52 may be attached to the outer portion 20, e.g., the forward-facing panel 50, in any suitable manner, e.g., stitching, ultrasonic welding, etc.

In examples in which the airbag 16 includes the extensions 52, the outer portion 20 may include a plurality of openings (not numbered) extending through the outer portion 20, e.g., the forward-facing panel 50, to the inflation chamber 68 of the outer portion 20. The openings may be spaced from each other circumferentially about the axis A. The openings may have any suitable shape, e.g., circular, and any suitable size, i.e., diameter, perimeter, etc.

The airbag 16 may include a vent (not shown) to aid in the management of the inflation medium or gas during inflation of the airbag 16. The airbag 16 may include any suitable number of vents. For example, the airbag 16 may include a plurality of vents each disposed in one respective opening. That is, each vent may be between the outer portion 20 and one extension 52. Each vent may be an adaptive vent. For example, each vent may be a one-way vent. The one-way vent may be configured to allow gas flow from the outer portion 20 to the extensions 52 and to prevent gas flow from the extensions 52 to the outer portion 20. In this example, the pressure in the extensions 52 may be maintained so that the extensions 52 provide support to the outer portion 20, which can assist in maintaining a shape of the outer portion 20 and controlling kinematics of the occupant.

With reference to FIGS. 2A-2B, the extensions 52 may include two ends 54, 56 spaced from each other. At least one end 54, 56 of each extension 52 encompasses one of the openings on the outer portion 20. That is, at least one of the ends 54, 56 is attached to the outer portion 20, e.g., the forward-facing panel 50, around one respective opening. For example, one end 54 of the extension 52 may cover one opening and the other end 56 of the extension 52 may be spaced from the outer portion 20 along the axis A, as shown in FIGS. 2A and 3A. That is, the extensions 52 may be elongated along the axis A. In such an example, the other end 56 of the extension 52 may abut the second reaction surface 70, e.g., the instrument panel 34.

As another example, the ends 54, 56 of each extension 52 may cover one respective opening on the outer portion 20, as shown in FIGS. 2B and 3B. In other words, both ends 54, 56 of each extension 52 may be attached to the outer portion 20. In such an example, the ends 54, 56 of each extension 52 are spaced from each other circumferentially about the axis A. In this situation, each extension 52 may have a generally U-shape between the outer portion 20 and the second reaction surface 70, e.g., instrument panel 34. That is, each extension 52 may have a curved portion (not numbered) between the two ends 54, 56. The curved portion may abut the second reaction surface 70, e.g., the instrument panel 34.

The airbag 16 may include an external tether 58. The external tether 58 may extend to each extension 52. For example, the external tether 58 may extend annularly about the axis A. The extensions 52 may be disposed between the external tether 58 and the outer portion 20. That is, the extensions 52 may extend along the axis A from the outer portion 20 to the external tether 58. Said differently, the external tether 58 may be disposed between the extensions 52 and the second reaction surface 70, e.g., the instrument panel 34. For example, the external tether 58 may be compressed between the extensions 52 and the second reaction surface 70, e.g., the instrument panel 34, when the airbag 16 is in the inflated position.

The external tether 58 may be attached to each extension 52, e.g., via stitching, ultrasonic welding, etc. In examples in which only one end 54 of each extension 52 is attached to the outer portion 20, the external tether 58 may be attached to the other ends 56 of each extension 52, as shown in FIGS. 2A and 3A. In examples in which both ends 54, 56 of each extension 52 are attached to the outer portion 20, the external tether 58 may be attached to the curved portions of each extensions 52, i.e., between the ends 54, 56, as shown in FIGS. 2B and 3B. The external tether 58 may be any suitable material. For example, the external tether 58 may be a same material as the airbag 16.

The external tether 58 may be uninflatable. In other words, the external tether 58 may not define an inflation chamber, e.g., the external tether 58 may be a panel of material that is not fixed to another panel, or itself, to enclose a volume for receiving inflation medium. The external tether 58 may be a woven fabric, or any other suitable material.

The external tether 58 may be under tension when the airbag 16 is in the inflated position. In other words, the external tether 58 may be taught, i.e., not relaxed, when the airbag 16 is in the inflated position. By tensioning the external tether 58, the external tether 58 may assist in maintaining the shape of each extension 52 during inflation. By maintaining the shape of the extensions 52 during inflation, the external tether 58 may assist in positioning the extensions 52 such that the outer portion 20 may engage a reaction surface via the extensions 52, which can assist the airbag 16 in controlling occupant kinematics.

The inflator 42 is in fluid communication with the airbag 16. The inflator expands the airbag 16 with inflation medium, such as a gas, to move the airbag 16 from the uninflated positions to the inflated positions. The inflator 42 may be supported by the reaction surface 14, as shown in FIG. 1. The inflator 42 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator may be, for example, at least partially in the inflation chambers 66, 68 to deliver inflation medium directly to the inflation chambers 66, 68 or may be connected to the inflation chambers 66, 68 through fill tubes, diffusers, etc.

The inflator 42 may have two separate outlets in communication with the inner portion 18 and the outer portion 20, respectively. The two outlets may, for example, be sized to inflate the respective portions 18, 20 to a desired inflation pressure within a desired amount of time. For example, one outlet may be in fluid communication with the inner portion 18 via one fill tube, and the other outlet may be in fluid communication with the outer portion 20 via another fill tube. Upon receiving a signal from, e.g., a computer, the inflator 42 may initiate inflation of the inner portion 18 and the outer portion 20 with an inflatable medium, such as a gas, simultaneously. Alternatively, upon receiving a signal from, e.g., the computer, the inflator 42 may initiate inflation of one of the inner portion 18 or the outer portion 20 prior to the other of the inner portion 18 or the outer portion 20. In alternative examples, the inflator 42 may separately inflate the inner portion 18 and the outer portion 20 in any suitable fashion. For example, the airbag assembly 38 may include a first inflator in fluid communication with the inner portion 18 and a second inflator in fluid communication with the outer portion 20.

Figure 4:
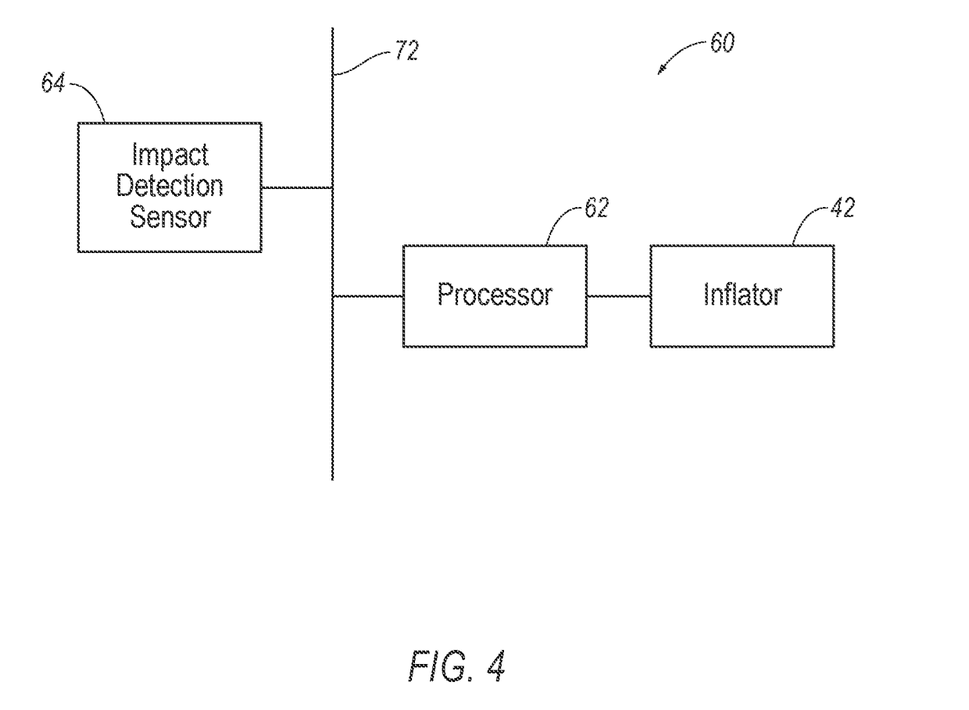
FIG. 4 is a block diagram of an inflation system of the vehicle.

With reference to FIG. 4, the vehicle 10 may include an inflation system 60 having a computer. The computer may be a microprocessor-based computing device implemented via circuits, chips, or other electronic components. For example, the computer may include a processor 62, memory, etc. The memory may store instructions executable by the processor 62 and the processor 62 may read the instructions from the memory and execute the instructions. The processor 62 may be programmed to initiate an inflation of the airbag 16 in response to the vehicle impact.

The vehicle 10 may include impact detection sensors 64 programmed to detect the vehicle impact to the vehicle 10. The impact detection sensors 64 may be disposed in the vehicle 10. The impact detection sensors 64 may be of various types, e.g., pressure sensor, acceleration sensor, vision sensor, etc. When the vehicle impact occurs, the processor 62 may receive one or more signals from the impact detection sensors 64 indicating the vehicle impact. In response to receiving the signals from the impact detection sensors 64, the processor 62 may initiate the inflation of the airbag 16. Alternatively, the processor 62 may initiate the inflation of the airbag 16 selectively based on information from the impact detection sensors 64 identifying the physical characteristics of the vehicle impact, e.g., which side of the vehicle 10 impacted, amount of pressure applied to the vehicle 10, etc. and also seat occupancy information, e.g., by using the occupancy sensors disposed inside the seats 26 sensing the occupancy status of the seats 26.

In order to receive the signals from the sensors, e.g., the impact detection sensors 64, and to initiate the inflation of the airbag 16, the processor 62 communicates with the sensors, e.g., the impact detection sensors 64, and the inflator 42, e.g., through a direct electrical wiring, through which an analog or a digital signal is transmitted, or through a communication network 72 like CAN (Control Area Network), Ethernet, LIN (Local Interconnect Network) or any other way.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper internal and fiber optics, including the internals that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In operation, the airbag 16 is in the uninflated position, under normal operating conditions of the vehicle 10. In the event of a vehicle impact, the impact detection sensors 64 detect the impact. The impact detection sensors 64 transmit a signal indicating the vehicle impact collision through the communication network 72 to the processor 62. When the vehicle impact is detected, the processor 62 transmits a signal through the communication network 72 triggering the inflator 42 to inflate the airbag 16 with inflation medium from the uninflated position to the inflated position. When the inflator 42 inflates the airbag 16 to the inflated position, the inflation medium flows into the airbag 16, increasing the pressure in the airbag 16. As the pressure is increased in the airbag 16, the inner portion 18 and the outer portion 20 inflates outwardly from the reaction surface 14. Since the outer portion 20 is radially spaced from the inner portion 18, the panel 24 is pulled by the outer portion 20 during inflation such that the panel 24 is tensioned. As the occupant moves relative to the seat 26 due to momentum of the vehicle impact, the occupant moves towards the airbag 16. When the occupant impacts the airbag 16, the airbag 16 controls the kinematics of the occupant.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. A restraint system comprising:
   a reaction surface;
   an airbag supported by the reaction surface and being inflatable along an axis away from the reaction surface to an inflated position;
   the airbag including an inner portion and an outer portion being concentric with the inner portion about the axis, the inner portion and the outer portion defining a gap therebetween in the inflated position; and
   the inner portion including a rearward-facing panel spaced from the reaction surface along the axis;
   the airbag including a panel extending radially across the gap from the inner portion to the outer portion, the panel being uninflatable and the panel being, in the inflated position, disposed between the rearward-facing panel and the reaction surface along the axis.

2. The restraint system of claim 1, wherein the panel is attached to the inner portion and the outer portion.

3. The restraint system of claim 1, wherein the outer portion in the inflated position extends farther along the axis away from the reaction surface than the inner portion in the inflated position.

4. The restraint system of claim 1, wherein the inner portion in the inflated position extends circumferentially about the axis, and the outer portion in the inflated position extends annularly around the inner portion.

5. The restraint system of claim 1, wherein the gap extends annularly around the inner portion in the inflated position.

6. The restraint system of claim 1, wherein the panel extends endlessly about the axis.

7. The restraint system of claim 1, further comprising an instrument panel, wherein the reaction surface is a steering wheel supported by the instrument panel and the airbag includes a plurality of extensions extending from the outer portion to the instrument panel in the inflated position.

8. The restraint system of claim 7, wherein the airbag includes a tether extending annularly about the axis to each extension, the tether is attached to each extension.

9. The restraint system of claim 8, wherein each extension is disposed between the outer portion and the tether.

10. The restraint system of claim 7, wherein the extensions are generally U-shaped between the outer portion and the instrument panel.

11. An airbag comprising:
    an inner portion and an outer portion each being inflatable in a first direction along an axis to an inflated position;
    the outer portion being concentric with the inner portion about the axis, the inner portion and the outer portion defining a gap therebetween in the inflated position; and
    a panel extending radially across the gap from the inner portion to the outer portion, the panel being uninflatable; and
    a plurality of extensions extending from the outer portion in the inflated position, the extensions extending in a second direction opposite the first direction in the inflated position.

12. The airbag of claim 11, wherein the panel is attached to the inner portion and the outer portion.

13. The airbag of claim 11, wherein the outer portion in the inflated position extends farther along the axis than the inner portion in the inflated position.

14. The airbag of claim 11, wherein the inner portion extends circumferentially about the axis, and the outer portion extends annularly around the inner portion.

15. The airbag of claim 11, wherein the gap extends annularly around the inner portion in the inflated position.

16. The airbag of claim 11, wherein the panel extends endlessly about the axis.

17. The airbag of claim 11, wherein each extension includes two ends spaced from each other about the axis and attached to the outer portion, each extension is generally U-shaped between the respective ends.

18. The airbag of claim 11, further comprising a tether extending annularly about the axis to each extension, the tether is attached to each extension.

19. The restraint system of claim 1, wherein the inner portion and the outer portion each define respective inflation chambers, the panel being disposed external to the inflation chambers.

20. An airbag comprising:
    an inner portion and an outer portion each being inflatable in a first direction along an axis to an inflated position;
    the outer portion being concentric with the inner portion about the axis, the inner portion and the outer portion defining a gap therebetween in the inflated position;
    the inner portion and the outer portion each including an impact panel, the impact panel of the outer portion being spaced from the impact panel of the inner portion in the first direction along the axis in the inflated position; and
    a panel extending radially across the gap from the inner portion to the outer portion and being uninflatable, the impact panel of the inner portion being, in the inflated position, spaced from the panel in the first direction along the axis.

* * * * *